(12) United States Patent
Batsch-Smith et al.

(10) Patent No.: US 11,053,849 B2
(45) Date of Patent: Jul. 6, 2021

(54) ANTI ICING METHOD AND APPARATUS

(71) Applicant: Mitsubishi Power Americas, Inc., Lake Mary, FL (US)

(72) Inventors: Lisa Batsch-Smith, Tijeras, MN (US); Stephen Bramham, Oviedo, FL (US); Scott Cloyd, Howey-in-the-Hills, FL (US); Beth Hays, Orlando, FL (US); Angel Hernandez, Oviedo, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 88 days.

(21) Appl. No.: 16/549,061

(22) Filed: Aug. 23, 2019

(65) Prior Publication Data

US 2021/0054786 A1 Feb. 25, 2021

(51) Int. Cl.
*F02C 7/047* (2006.01)
*F02C 1/05* (2006.01)
*F02C 7/057* (2006.01)
*F02C 9/28* (2006.01)
*G05D 23/19* (2006.01)

(52) U.S. Cl.
CPC .............. *F02C 7/047* (2013.01); *F02C 1/05* (2013.01); *F02C 7/057* (2013.01); *F02C 9/28* (2013.01); *G05D 23/1902* (2013.01)

(58) Field of Classification Search
CPC .. F02C 7/047; F02C 7/057; F02C 1/05; F02C 9/28; G05D 23/1902
See application file for complete search history.

(56) References Cited

U.S. PATENT DOCUMENTS

| | | | |
|---|---|---|---|
| 6,233,917 B1 | 5/2001 | Bahr et al. | |
| 8,266,910 B2 | 9/2012 | Feher et al. | |
| 8,483,929 B2 | 7/2013 | DiAntonio et al. | |
| 9,297,316 B2 | 3/2016 | Scipio et al. | |
| 2006/0010876 A1* | 1/2006 | Hoffmann | F02C 7/057 60/773 |
| 2009/0134272 A1* | 5/2009 | Vauchel | B64D 33/02 244/54 |
| 2020/0040823 A1* | 2/2020 | Batsch-Smith | F01D 25/02 |

FOREIGN PATENT DOCUMENTS

EP 2351915 A1 8/2011

* cited by examiner

*Primary Examiner* — Steven M Sutherland (74) *Attorney, Agent, or Firm* — Schwegman Lundberg & Woessner, P.A.

(57) ABSTRACT

A method of reducing applied heat within an inlet duct of a gas turbine generating electricity includes applying heat to the inlet duct of the gas turbine to attain an initial temperature set point and to produce conditions sufficient for preventing formation of ice within the inlet duct, measuring a position of an inlet guide vane (IGV) of the gas turbine, an inlet duct temperature, and an inlet duct relative humidity to determine a thermodynamic state in the inlet duct, evaluating the thermodynamic state to determine if the conditions are sufficient for preventing formation of ice within the inlet duct, and in response to determining that sufficient conditions exist within the inlet duct for preventing formation of ice, adjusting the applied heat to maintain the measured inlet duct temperature.

20 Claims, 4 Drawing Sheets

ANTI ICING METHOD AND APPARATUS

TECHNICAL FIELD

This document pertains generally, but not by way of limitation to gas turbine engines. More specifically, but not by way of limitation, the present application relates to apparatus and methods to control the application of anti-icing heat to gas turbine engines.

BACKGROUND

In some turbines, most commonly at low mass flow and density conditions, compressor geometry and operation of compressor inlet guide vanes (IGVs) may result in a temperature decrease at some of the initial stages of the compressor. As described by the Joule-Thomson effect, throttling of a real gas can result in a net temperature decrease.

In certain ambient temperature and relative humidity conditions, this effect can lead to the formation of ice upon components of the initial stages of the compressor. Any ice created within the compressor may be liberated and can cause impact damage on downstream components. These ambient conditions are most problematic when the inlet guide vanes are relatively closed, typically during low load and emission control operations.

It is common for turbine manufacturers to incorporate anti-icing (anti-icing) protection systems which add heat to the inlet air to prevent ice. Various anti-icing system heat sources have been used, such as injection of hot compressed air; a heat exchanger placed within the inlet-duct, and injection of steam or turbine exhaust gas.

Typically, a single curve for worst-case conditions based on two factors (ambient temperature and humidity) defines conditions during which anti-icing systems will apply heat. Based on measured conditions, it is determined to apply anti-icing heat if the measured conditions are within the curve. Application of anti-icing heat is controlled to a set point temperature within an inlet duct of the turbine calculated to be outside the area of the curve. Common control philosophy uses set points that are typically very conservative for the current conditions.

Any application of anti-icing heat to the inlet will decrease the overall system efficiency (or increase the heat rate) as the energy associated with creating the heat represents an operational debit.

Typically, to increase load, the fuel flow (and thus the combustion temperature) within a turbine is increased. However, turbine components an operational temperature limits. Therefore, the output of the turbine is restricted by the amount of heat generated by combustion. Because heat provided by the anti-icing system is carried through to the combustors and turbine exhaust, use of anti-icing heat reduces available temperature margin for increasing load. The result is that anti-icing operation restricts the maximum load output, reduces revenue opportunity and increases the per-unit cost of electricity produced.

Applied anti-icing can also increase the production of harmful gases such as CO and SO4. To maintain proper emission limits, units may employ expensive countermeasures which need to be tightly controlled to avoid the release of excessive emissions.

Overview

An embodiment of the disclosure includes a method of reducing applied heat within an inlet duct of a gas turbine generating electricity. The method includes applying heat to the inlet duct of the gas turbine to attain an initial temperature set point and to produce conditions sufficient for preventing formation of ice within the inlet duct, and measuring a position of an inlet guide vane (IGV) of the gas turbine, an inlet duct temperature, and an inlet duct relative humidity to determine a thermodynamic state in the inlet duct. The method further includes evaluating the thermodynamic state to determine if the conditions are sufficient for preventing formation of ice within the inlet duct, and in response to determining that sufficient conditions exist within the inlet duct for preventing formation of ice, adjusting the applied heat to maintain the measured inlet duct temperature.

Another embodiment of the disclosure includes a gas turbine with a compressor and an inlet duct to channel ambient air to the compressor. A heat source is disposed within the inlet duct upstream of the compressor and inlet duct temperature and relative humidity sensors are disposed downstream of the heat source. An inlet guide vane (IGV) assembly is disposed downstream of the sensors and controls a mass of air flow into the compressor. A controller is in signal communication with the sensors, the IGV assembly, and the heat source. The controller is configured to command the heat source to apply heat to the inlet duct and attain an initial temperature set point to produce conditions sufficient for preventing formation of ice within the inlet duct. The controller measures a position of the IGV assembly, an inlet duct temperature, and an inlet duct relative humidity to determine a thermodynamic state in the inlet duct and evaluates the thermodynamic state to determine if the conditions are sufficient for preventing formation of ice within the inlet duct. If sufficient conditions exist within the inlet duct for preventing formation of ice, the controller adjusts the applied heat to maintain the measured inlet duct temperature.

DESCRIPTION

An embodiment of the disclosure economizes the application of heat to prevent ice formation via reduction of two factors: 1) the instances of heat application by redefining conditions that call for heat and; 2) the duration of heat application via continual evaluation of the conditions (including the impact of heat application). Three factors are considered: IGV position, temperature and relative humidity.

Based on thermodynamic principles, multiple reference curves at different IGV positions are developed to define those conditions under which anti-icing is required to eliminate specific types of icing and avoid associated damage. Each curve defines an area in which ice formation is likely, is a function of relative humidity and ambient temperature for a specific IGV position, and can represent area(s) of operation that are much smaller than the worst-case condition presumed by the Prior Art. Interpolation between the curves (rather than using only the next-most-conservative curve) further ensures that anti-icing heat is applied only when absolutely necessary. Additionally, because the prior art only evaluates outside environmental conditions, (which are not impacted by application of anti-icing heat) the quantity and duration of anti-icing heat is applied far longer than really needed. An embodiment of the disclosure considers the impact of the applied heating by evaluating the change in temperature and relative humidity downstream of the heating injection point. This improvement in precision and triangulation reduces both the number of instances and quantity of inlet heating required. The applied heating would not require the unit to reach a fixed increased temperature, but would rather aim for a closer set point that moves the unit out of the conditions of risk for a specific IGV position to protect the gas turbine and maximize revenue and profit for the owner/operator.

Typical anti-icing systems control the bleed valve modulation to a temperature change rather than a relative humidity change. An embodiment may simplify adaptation by use of temperature as the control set point, with relative humidity used as an ancillary determinate of state for anti-icing operation. When relative humidity drops out of the region of required anti-icing operation, the controls will reduce the temperature set point such that the bleed valve will close and application of anti-icing heat will be ceased.

Figure 1:
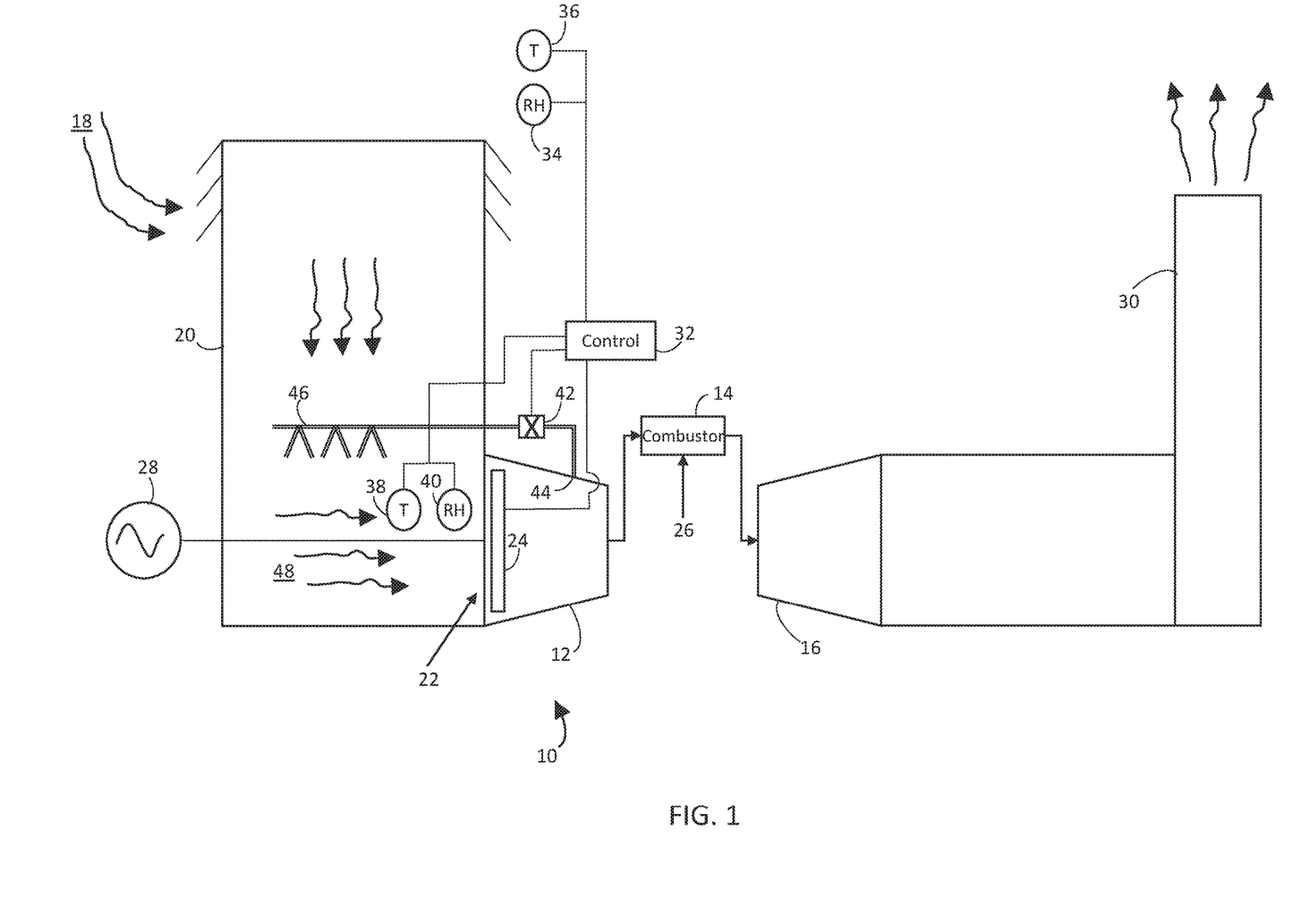
FIG. 1 is a schematic diagram of a gas turbine system in accordance with an embodiment of the disclosure.

A typical turbine system 10 that may use an example of the disclosure is shown in FIG. 1. The turbine system 10 includes a compressor 12, combustor 14, and turbine 16. As will be appreciated by one of skill in the art, ambient air 18 enters an inlet duct 20 and is brought to an entrance 22 of the compressor 12. Inlet guide vanes 24 may be positioned in order to adjust an amount of air 18 admitted to the compressor 12. The compressor 12 compresses the air and mixes it with fuel 26 within the combustor 14, where the mixture is combusted, creating high energy air, The resulting air flow exits forcefully through the turbine 16, converting the thermal energy into rotational mechanical energy which is applied to a rotor and can drive an electrical generator 28 to create electricity. The high energy air exits through an exhaust stack 30.

A controller 32 may be in signal communication with various sensors and components, such as ambient relative humidity and temperature sensors 34, 36 inlet duct relative humidity and temperature sensors 38, 40, and an anti-icing compressor bleed control valve 42. The anti-icing compressor bleed valve 42 is in fluid communication with a discharge 44 of later stages of the compressor 12 to receive heated compressed air. A manifold 46 is located between the anti-icing bleed valve 42 and the compressor inlet duct 20 to distribute the hot compressed air, which mixes with ambient air 18 within the inlet duct 20. This provides an increasingly warmer, blended atmosphere, or mixed air 48 to the entrance 22 of the compressor 12. The inlet duct sensors 38, 40 are typically located downstream of the manifold 46, so that the properties of the mixed air 48 can be measured before it enters the entrance 22 of the compressor 12. The controller 32 may be in communication with various other sensors, valves or actuators, depending on the complexity of the control philosophy and/or redundancy. The controller 32 commands the position of the bleed control valve 42 and adjusts the amount of hot compressed air sent to the compressor entrance 22 based on inputs from the ambient and inlet sensors 34, 36, 38, 40 and position of the IGVs 24 as described further below.

Figure 2:
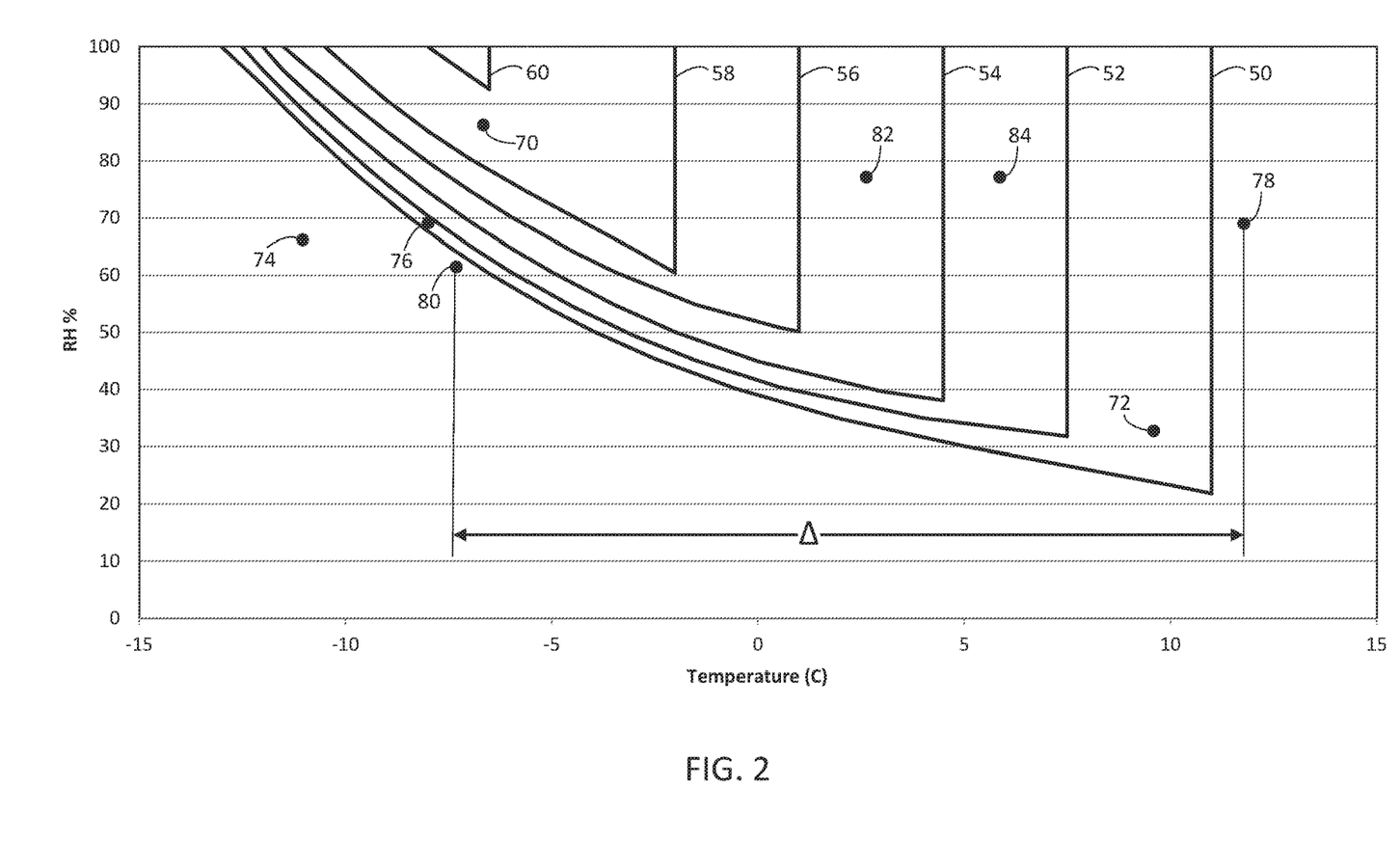
FIG. 2 is an example of representative anti-icing curves in accordance with an embodiment of the disclosure.

FIG. 2 is a graph depicting a potential of ice formation based upon relative humidity, temperature and IGV position. The horizontal axis corresponds to temperature and the vertical axis corresponds to relative humidity. A series of reference curves 50-60, each correspond to a different position of the IGVs 24. Curve 50 represents positioning of the inlet guide vanes 24 in a nearly closed position to reduce an amount of air to be admitted through the entrance 22 of the compressor 12. Curve 60 represents positioning of the inlet guide vanes 24 in a nearly opened position to relatively freely admit air through the entrance 22 of the compressor 12.

If a point having the coordinates of (temperature, relative humidity) is located inside of a reference curve corresponding to the current IGV position, the conditions for ice formation within the inlet duct are satisfied. Therefore, a need for anti-icing heat to be applied (via opening of the control valve 42) is determined when the current state of temperature and relative humidity are within the curve for the current IGV position. Although FIG. 2 depicts six reference curves 50-60 representing six discrete positions of inlet guide vanes 24, an appropriate intermediate curve can be determined for any intermediate inlet guide vane 24 position, based upon interpolation between two appropriate reference curves corresponding to inlet guide vane 24 positions that bound the intermediate inlet guide vane 24 position.

A point defined by measurement of ambient temperature and relative humidity via sensors 34, 36 defines the state within the inlet duct 20 in the absence of any applied heat. The controller 32 evaluates the location of such point relative to the applicable reference curve 50-60 (or interpolated intermediate curve) corresponding to the position of the inlet guide vanes 24 to determine if application of anti-icing heat (such as via opening of the anti-icing compressor bleed valve 42) to avoid ice formation is required.

As described above, a common prior art control approach uses a singular, conservative curve (such as reference curve 50). If the current state is within the singular curve, a temperature set point is selected, and the anti-icing is applied until the selected temperature set point is attained. After the set point is attained, the prior art control monitors whether the ambient conditions are within or outside of the curve, and responds accordingly.

Each turbine system 10 may have one or more systems (such as compressor bleed manifold 46 including anti-icing nozzles or a heat exchanger, not shown) that allow the temperature of the mixed air 48 to be increased for the protection or performance of the turbine system 10. Operational data has shown that it is more appropriate to assess/measure the conditions after the air passes through these systems as these are the conditions to which the compressor 12, combustor 14, and turbine 16 will be exposed.

As described above, a need to add anti-icing heat to obtain a desired temperature set point are initially determined based on ambient temperature, relative humidity, and inlet guide vane 24 position. Thereafter, an embodiment of the invention uses the relative humidity and temperature sensors 38, 40 downstream of the anti-icing system (such as the compressor discharge manifold 46) to evaluate the effect of the applied heating upon the temperature and relative humidity measured at the entrance 22 of the compressor 12. The changing state of compressor inlet 22 temperature and relative humidity, responsive to the addition of anti-icing heat, may be modeled or directly measured via sensors 38, 40. The temperature and relative humidity at the entrance 22 of the compressor 12 may be used to determine an alternative temperature set point.

As shown in FIG. 2, the states represented by points 70 and 72 are inside, or within, the reference curve 50 and therefore, (for IGVs 24 positioned corresponding to curve 50) will each require the addition of anti-icing heat because they are inside of the applicable reference curve 50. Alternatively, the state represented by point 74 (for any inlet guide vane 24 position depicted by reference curves 50-60) will not require the addition of anti-icing heat, as point 74 is outside all of the reference curves 50-60.

While operating at the state of relative humidity and temperature shown by point 72, a change in inlet guide vane 24 position from a position represented by reference curve 50 to a position represented by reference curve 52, will remove the need to apply anti-icing heat.

If anti-icing heat is to be applied, the controller 32 will select an initial temperature set point that represents a state for which the combination of relative humidity and temperature are outside the applicable curve for the current inlet guide vane 24 position. For example, if the ambient conditions are represented by point 76 with an inlet guide vane 24 position corresponding to reference curve 50, the controller 32 may select an initial temperature set point corresponding to point 78, outside of reference curve 50, to prevent the formation of ice.

While the anti-icing heat is being applied (e.g. control valve 42 is commanded open via controller 32), the controller 32 logic continuously evaluates the conditions within the inlet duct 20 at the entrance 22 of the compressor 12 via inlet relative humidity and temperature sensors 38, 40. The controller 32 logic calculates the current intersection of conditions every clock cycle of the controller 32 processor. As the mixed air 48 is warmed, the rate of change of decreasing humidity may be greater than temperature increase. Therefore, monitoring the change of relative humidity may illuminate that the current conditions at the entrance 22 of the compressor 12 may leave the anti-icing required region defined by the applicable curve (such as reference curve 50) sooner than solely waiting for the mixed air 48 to warm to the initial temperature set point, such as at point 78.

For example, it may be determined that while operating with the inlet guide vanes 24 positioned corresponding to reference curve 50 with ambient relative humidity and temperature measurements at point 76, the temperature of mixed air 48 to the compressor entrance 22 should be increased to the right of the reference curve 50 to an initial temperature set point represented by point 78 to eliminate the risk of ice formation. With the application of heat, changes in relative humidity and temperature of the mixed air 48 at the entrance 22 of the compressor 12 can be such that a lower temperature set point may also prevent icing.

Reiterative monitoring of the conditions enables determination of the lower set point. For example, following the application of anti-icing heat to attain the initial temperature set point represented by point 78, the temperature and relative humidity of the mixed air 48 at the entrance 22 of compressor 12 may transition to a state represented by point 80, which is outside the reference curve 50 and will prevent the formation of ice. Upon determination that the mixed air 48 is at the state represented by point 80 outside the reference curve 50, the control system 32 will update the initial temperature set point from the temperature represented by point 78 to an enhanced temperature set point, at the temperature represented by point 80. The enhanced temperature set point represented by point 80 is substantially lower in temperature (by delta) than the initial temperature set point represented by point 78. This lower, enhanced temperature set point requires less anti-icing heat. With a requirement for less heat, the controller 32 commands a smaller opening of the bleed valve 42, which represents reduced consumption of compressor bleed air, and a more efficient and economically attractive set point and operational state. While anti-icing heat is applied to maintain the enhanced set point of represented by point 80, the controller 32 will monitor the temperature and relative humidity of the ambient air 18 to confirm the need to apply anti-icing heat. If the temperature and relative humidity of the ambient air 18 measured by sensors 34, 36 changes such as from point 76 to point 74, then application of anti-icing heat will no longer be necessary and the controller 32 will command the bleed valve 42 to close.

Execution of a plan to attain the initial temperature set point represented by point 78 (in response to ambient conditions represented by point 76) may yield a preferred set of operational conditions such as the enhanced temperature set point represented by point 80. Upon attainment of such preferred operational conditions, the plan will be changed to attain the preferred operational conditions (such as at point 80) rather than the initial target (such as at point 78). The controller 32 will modulate the bleed control valve 42 to maintain this enhanced temperature set point. This reduces a mass of compressor 12 via discharge 44 consumed to prevent compressor icing and increases an efficiency of the turbine system 10.

The foregoing discussion has focused upon changes in temperature and relative humidity with the inlet guide vanes positioned corresponding to reference curve 50. Air mass flow rate is directly related to increasing the opening of the inlet guide vanes 24, such as a transition of inlet guide vane 24 position from reference curve 50 to reference curve 52 to reference curve 54, and so on. Generally, decreased air mass flow results in decreased temperature (via the Joule Thompson effect).

The anti-icing heat may be preemptively added prior to changing the inlet guide vane 24 position to ensure that changing conditions and inlet guide vane 24 positions do not create any risk of formation of ice. For example, If ambient conditions are represented by point 82, a potential for ice formation may exist if the position of the inlet guide vanes 24 are requested to be closed from a position represented by reference curve 56 to a position represented by reference curve 54 (as may occur in conjunction with a load reduction). The predicted anti-icing requirement will temporarily override the load call to position the inlet guide vanes 24. To reduce a risk of the formation of ice occurring soon after such movement of the inlet guide vanes 24, a command to transition the position of the inlet guide vanes 24 may be delayed. The delay provides an opportunity to initiate a protective application of anti-icing heat to an initial temperature set point of the mixed air 48 as represented by point 84. Upon attainment of the temperature represented by point 84, the inlet guide vanes 24 may be transitioned from the position represented by reference curve 56 to a position represented by reference curve 54. As described above, after the inlet guide vane 24 are positioned at reference curve 54, the controller 32 will seek to identify whether an enhanced temperature set point more preferable to the initial temperature set point exists.

While inlet guide vanes are typically transitioned to a relatively closed position to accommodate load decreases than to improve emissions, the application of the anti-icing heat may also improve emissions resulting from increased combustor and downstream gas path temperatures.

Figure 3:
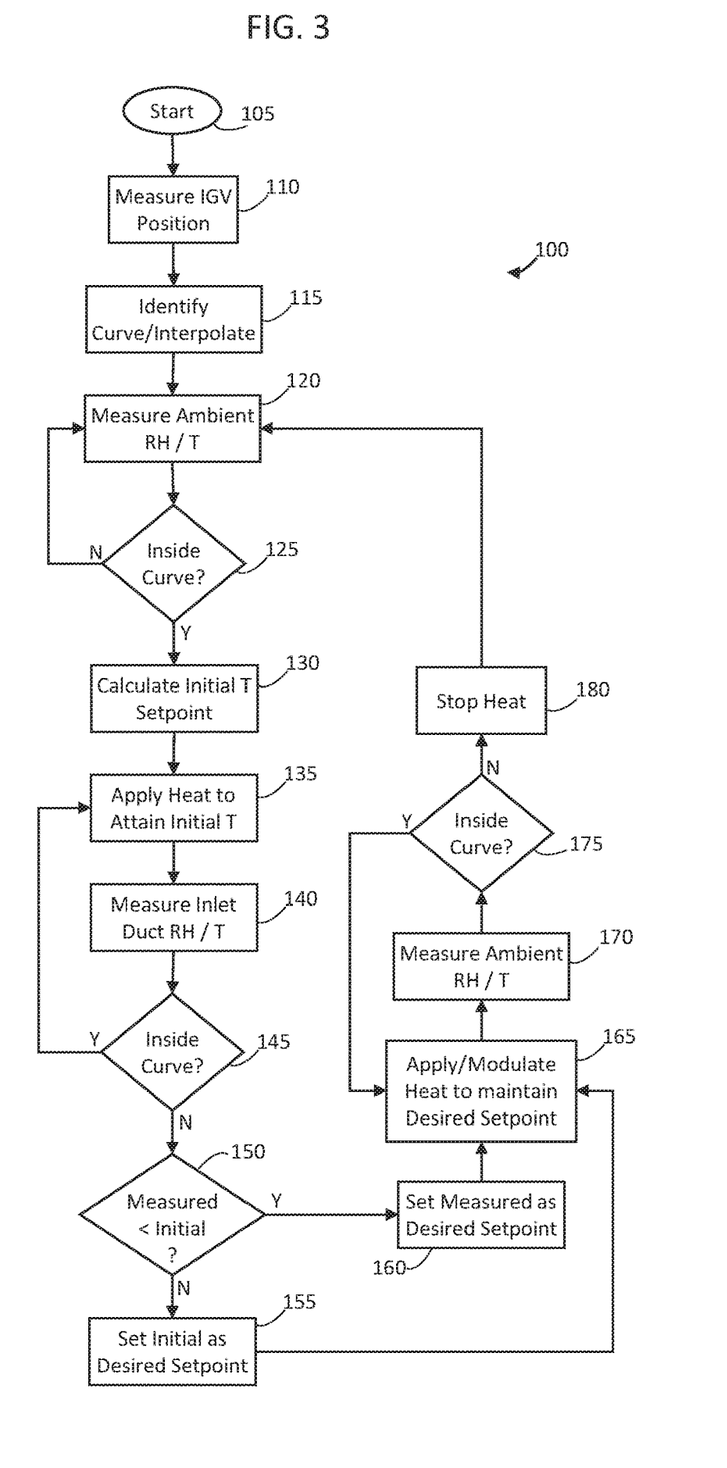
FIG. 3 is a flowchart of process steps of an example method of operation of a gas turbine in accordance with an embodiment of the disclosure.

FIG. 3 depicts a flowchart of process steps of an example method 100 of operation of the system 10. The method starts at step 105. At step 110, the method measures the position of the IGVs 24. At step 115, the method compares the measured position of the IGVs 24 to various reference curves, such as reference curves 50-60, for example. If the position of the IGVs 24 measured at step 110 is equal to one of the reference curves 50-60, that reference curve may be used for subsequent steps. If the position of the IGVs 24 is not equal to one of the reference curves, an intermediate curve may be developed via interpolation of two adjacent reference curves and used for subsequent steps in the process. At step 120, the process measures the ambient temperature and ambient relative humidity via sensors 34, 36, and determines their locus upon a graph, such as the graph of FIG. 2. Step 125 evaluates the locus of the ambient temperature and relative humidity in conjunction with the curve that was identified at step 115. If the locus is outside of the curve, the process determines that the conditions for the formation of ice within the inlet duct do not exist, and therefore, application of anti-icing heat is not necessary. In such case, the process returns to step 120 and the controller 32 continues to monitor the ambient conditions to determine if they may support the formation of ice within the inlet duct 20.

Alternatively, if the evaluation at step 125 determines that the locus of ambient temperature and relative humidity is inside the curve and indicative that ice may form, the method proceeds to step 130 and calculates an initial temperature set point. To prevent the formation of ice, the initial temperature set point shall be greater than the ambient temperature measured at step 120 and located outside of the curve corresponding to the current IGV 24 position. Following calculation of the initial temperature set point, step 135 proceeds with the addition or application of heat, such as to command open the control valve 42 to allow compressor bleed air into the inlet duct 20 to add heat, in order to attain the initial temperature set point.

Following the application of heat, step 140 measures the temperature and relative humidity of the air within the inlet duct 20 via sensors 38, 40 and in order to determine a thermodynamic state within the inlet duct 20, via determination of the locus of temperature and relative humidity upon the graph. Step 145 evaluates the locus of the inlet duct 20 temperature and relative humidity relative to the curve that was identified at step 115. If the locus is inside the curve, the process returns to step 135 to continue the addition of heat. If the locus is outside the curve and the thermodynamic state is sufficient for preventing formation of ice within the inlet duct, the method proceeds to step 150 and compares the temperature of the inlet duct 20 measured at step 140 with the initial temperature set point at calculated at step 130. If the measured inlet duct 20 temperature is greater than the initial temperature set point, step 155 sets the initial temperature set point as a desired temperature set point. If the measured inlet duct 20 temperature is less than the initial temperature set point, step 160 sets the measured inlet duct temperature as the desired temperature set point.

Step 165 modulates the addition of heat, such as via bleed control valve 42 to maintain the temperature of the inlet duct 20 at the desired temperature set point. It will be appreciated that maintenance of a lower temperature in place of a higher temperature will result in a reduction, or downward adjustment, of required heat. The reduction in required heat will accommodate a likewise reduction in use of compressor anti-icing bleed air.

Step 170 measures the ambient relative humidity and temperature and identifies their locus upon the graph. Step 175 evaluates the locus of the ambient temperature and relative humidity in conjunction with the curve identified at step 115. If the locus is outside of the curve, step 175 determines that the conditions for the formation of ice within the inlet duct do not exist, and therefore, continued addition of anti-icing heat is not necessary. In such case, step 180 ends the addition of heat, such as by closing bleed control valve 42, and the method proceeds to step 120 to measure and monitor the ambient conditions. If the locus is inside the curve, the method returns at step 165 and continues the addition of heat to maintain the desired set point temperature.

The foregoing method 100 applies to a single position of the IGVs 24. If the position of the IGVs 24 are changed at any time during the method, it will proceed to step 110 to measure the IGV position and proceed therefrom.

Figure 4:
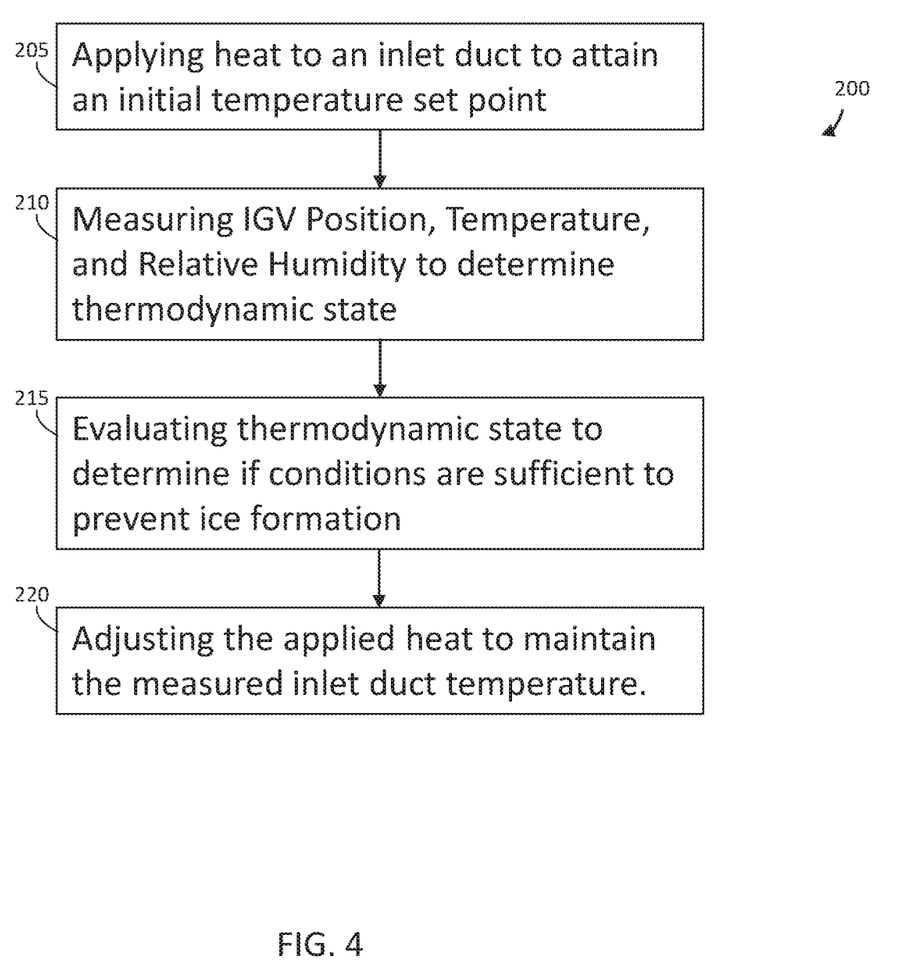
FIG. 4 is a flowchart of process steps of an example method to reduce the amount of bleed air heat within the air inlet duct.

FIG. 4 depicts a flowchart of process steps of an example method 200 of operation of the system 10 to reduce the amount of bleed air heat within the air inlet duct 20. Step 205 applies heat within the inlet duct 20 of the gas turbine to attain an initial temperature set point and prevent the formation of ice within the inlet duct 20. Step 210 measures a position of the inlet guide vane (IGV) 24 the inlet duct 20 temperature, and the inlet duct 20 relative humidity to determine the thermodynamic state within the inlet duct. Step 215 evaluates the thermodynamic state to determine if the conditions within the inlet duct 20 are sufficient to prevent the formation of ice. If it is determined (as Step 215) that the thermodynamic state within the inlet duct 20 is sufficient to prevent ice, Step 220 adjusts the provided heat to maintain the measured inlet duct temperature.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method of reducing applied heat within an inlet duct of a gas turbine generating electricity, the method comprising:
   applying heat to the inlet duct of the gas turbine to attain an initial temperature set point and to produce conditions sufficient for preventing formation of ice within the inlet duct;
   measuring a position of an inlet guide vane (IGV) of the gas turbine, an inlet duct temperature, and an inlet duct relative humidity to determine a thermodynamic state in the inlet duct;
   evaluating the thermodynamic state to determine if the conditions are sufficient for preventing formation of ice within the inlet duct; and
   in response to determining that sufficient conditions exist within the inlet duct for preventing formation of ice, adjusting the applied heat to maintain the measured inlet duct temperature.

2. The method of claim 1, further comprising comparing the measured inlet duct temperature to the initial temperature set point.

3. The method of claim 2, wherein:
   the measured inlet duct temperature is less than the initial temperature set point when the sufficient conditions exist within the inlet duct for preventing formation of ice.

4. The method of claim 1, wherein the evaluating the thermodynamic state comprises comparing the measured inlet duct temperature, and inlet duct relative humidity to a curve corresponding to the position.

5. The method of claim 4, wherein the curve is one of a plurality of reference curves, each of the plurality corresponding to a position of IGV and identifying a potential condition for the formation of ice within the inlet duct based upon temperature, relative humidity, and IGV position.

6. The method of claim 5, further comprising:
   in response to the measured position being different than any of the plurality of corresponding reference curves, defining an intermediate curve by interpolation between two of the plurality of reference curves; and
   comparing the measured inlet duct temperature, inlet duct relative humidity and position to the intermediate curve to determine if ice may form.

7. The method of claim 1 wherein the applying heat to the inlet duct comprises opening a compressor bleed control valve.

8. The method of claim 1 further comprising identifying that a change from a first position of the to a second position of the IGV will create a potential condition for the formation of ice within the inlet duct and taking corrective action to prevent the potential condition for the formation of ice.

9. The method of claim 8 wherein the corrective action comprises providing heat to the inlet duct before changing the IGV from the first position to the second position.

10. The method of claim 1, further comprising:
    measuring an ambient temperature and an ambient relative humidity to determine an ambient thermodynamic state;
    evaluating the measured position and ambient thermodynamic state to determine if they create a potential condition for the formation of ice within the inlet duct; and
    in response to determining that the measured position and ambient thermodynamic state create the potential condition for the formation of ice, defining the initial temperature set point to prevent ice formation.

11. A gas turbine comprising:
    a compressor;
    an inlet duct in fluid communication with the compressor, the inlet duct configured to channel ambient air to the compressor;
    a heat source disposed within the inlet duct upstream of the compressor;
    an inlet duct temperature sensor and an inlet duct relative humidity sensor disposed within the inlet duct downstream of the heat source;
    an inlet guide vane (IGV) assembly disposed downstream of the inlet duct temperature sensor and the inlet duct relative humidity sensor, the IGV assembly configured to control a mass of air flow into the compressor; and
    a controller in signal communication with the inlet duct temperature sensor, the inlet duct relative humidity sensor, the IGV assembly, and the heat source, the controller configured to:

command the heat source to apply heat to the inlet duct and attain an initial temperature set point to produce conditions sufficient for preventing formation of ice within the inlet duct;

measure a position of the IGV assembly, an inlet duct temperature, and an inlet duct relative humidity to determine a thermodynamic state in the inlet duct;

evaluate the thermodynamic state to determine if the conditions are sufficient for preventing formation of ice within the inlet duct; and in response to determining that sufficient conditions exist within the inlet duct for preventing formation of ice, adjusting the applied heat to maintain the measured inlet duct temperature.

12. The gas turbine of claim 11, wherein the controller compares the measured inlet duct temperature to the initial temperature set point.

13. The gas turbine of claim 12, wherein the measured inlet duct temperature is less than the initial temperature set point when the sufficient conditions exist within the inlet duct for preventing formation of ice.

14. The gas turbine of claim 11, wherein the controller compares the measured inlet duct temperature and inlet duct relative humidity to a curve corresponding to the position.

15. The gas turbine of claim 14, wherein the curve is one of a plurality of reference curves, each of the plurality corresponding to a position of IGV and identifying a potential condition for the formation of ice within the inlet duct based upon temperature, relative humidity, and IGV position.

16. The gas turbine of claim 15 wherein:

the controller is responsive to the measured position being different than any of the plurality of corresponding reference curves to define an intermediate curve by interpolation between two of the plurality of reference curves; and the controller compares the measured inlet duct temperature, inlet duct relative humidity and position to the intermediate curve to determine if ice may form.

17. The gas turbine of claim 11, wherein the heat source comprises a bleed manifold in fluid communication with a compressor bleed outlet and disposed within the inlet duct upstream of the compressor; and a bleed control valve disposed between the bleed outlet and the bleed manifold to control a flow of bleed air from the bleed outlet through the bleed manifold.

18. The gas turbine of claim 11, wherein:

the controller is responsive to identify that a change from a first position of the IGV to a second position of the IGV will create a potential condition for the formation of ice within the inlet duct and taking corrective action to prevent the potential condition for the formation of ice.

19. The gas turbine of claim 18, wherein the controller commands the heat source to provide heat to the inlet duct before changing the IGV from the first position to the second position.

20. The gas turbine of claim 11, the controller is further configured to:

measure an ambient temperature and an ambient relative humidity to determine an ambient thermodynamic state;

evaluate the measured position and the ambient thermodynamic state to determine if they create a potential condition for the formation of ice within the inlet duct;

in response to determining that the measured position and ambient thermodynamic state create the potential condition for the formation of ice, define the initial temperature set point to prevent ice formation.

* * * * *